Figure 6:
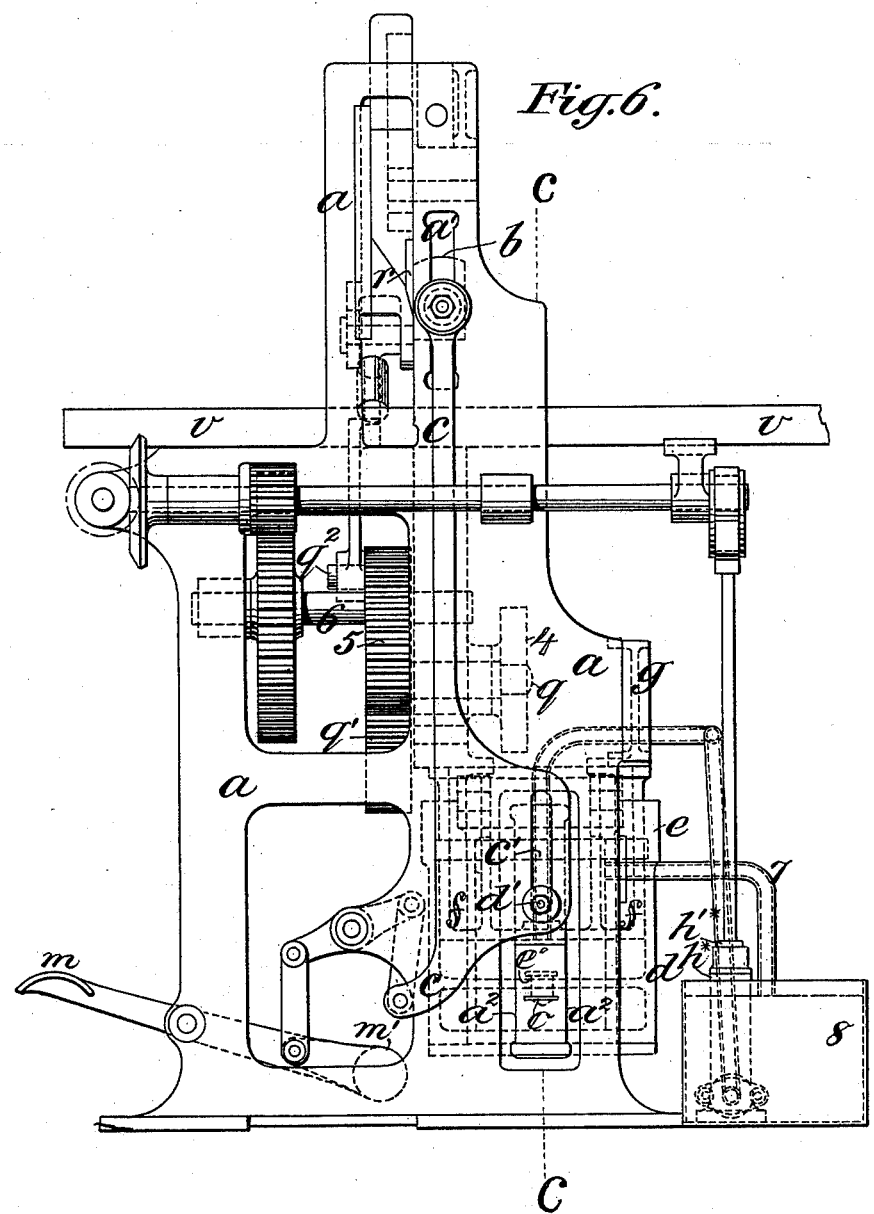

(No Model.) 6 Sheets—Sheet 1.
T. FURNIVAL.
GUILLOTINE FOR CUTTING PAPER.
No. 509,522. Patented Nov. 28, 1893.
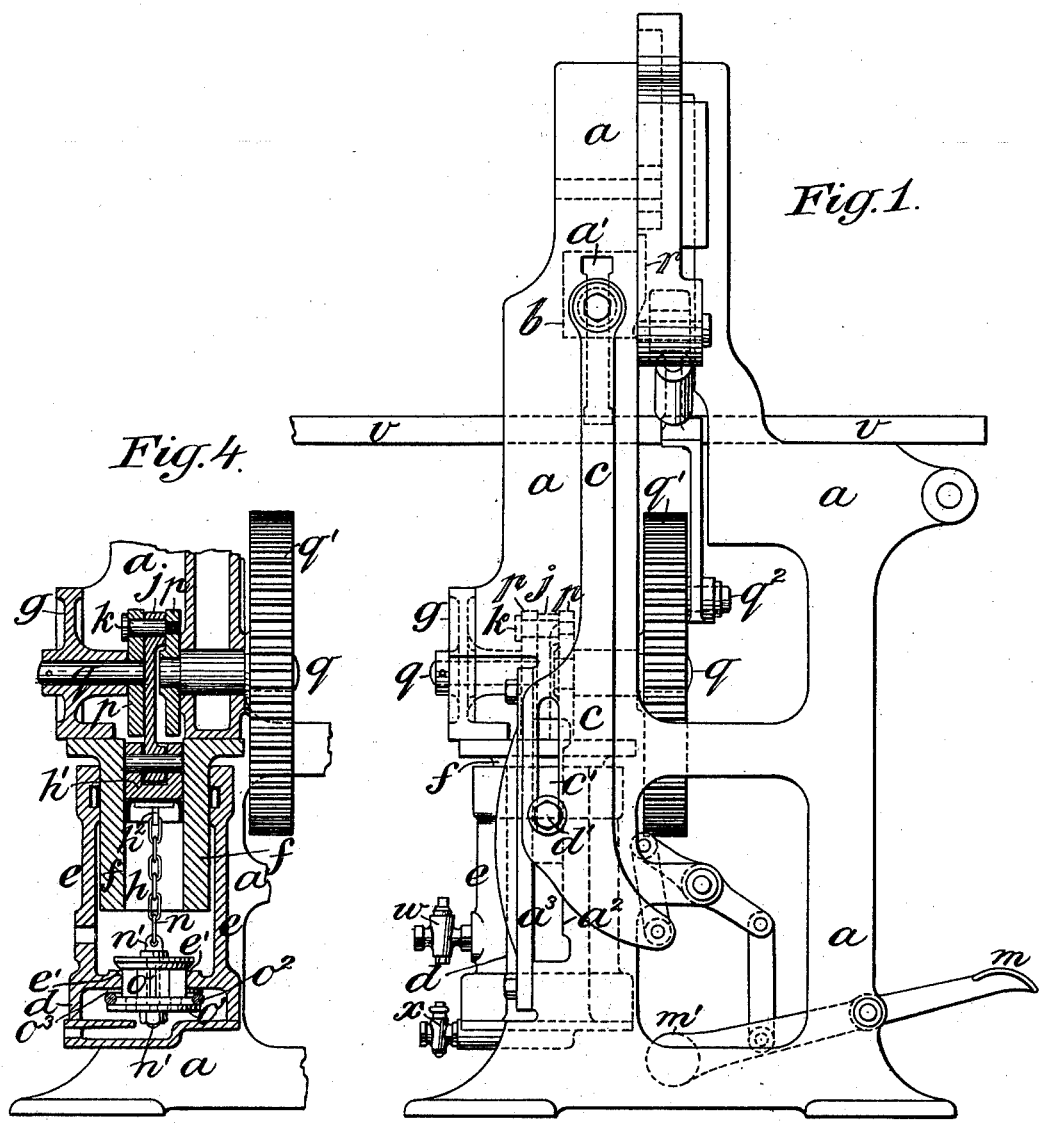
Witnesses:
C. Sundgren
W. N. Hayhort
Inventor:
Thomas Furnival
by attorneys
Brown & Seward (No Model.) 6 Sheets—Sheet 2.
T. FURNIVAL.
GUILLOTINE FOR CUTTING PAPER.
No. 509,522. Patented Nov. 28, 1893.
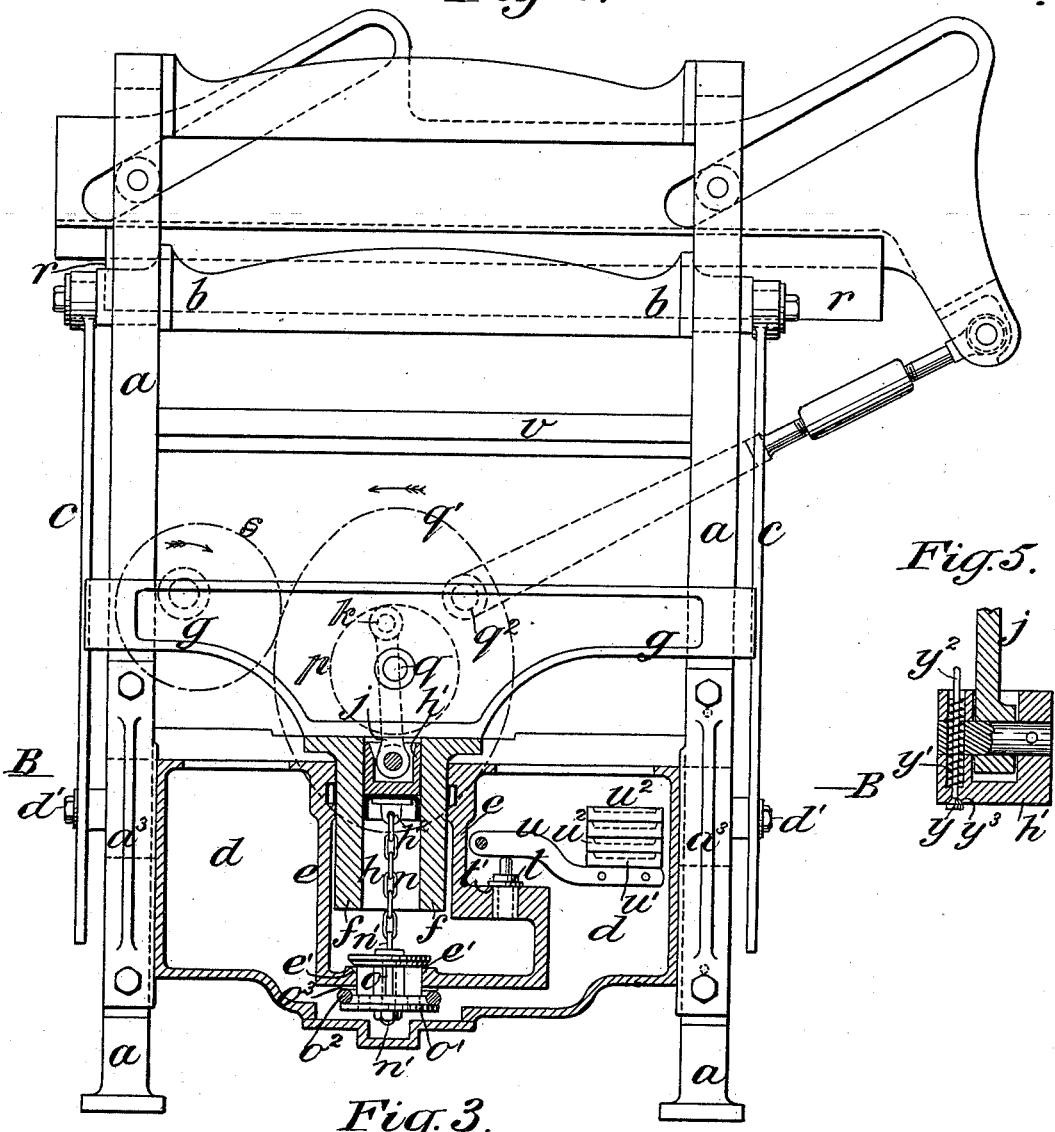
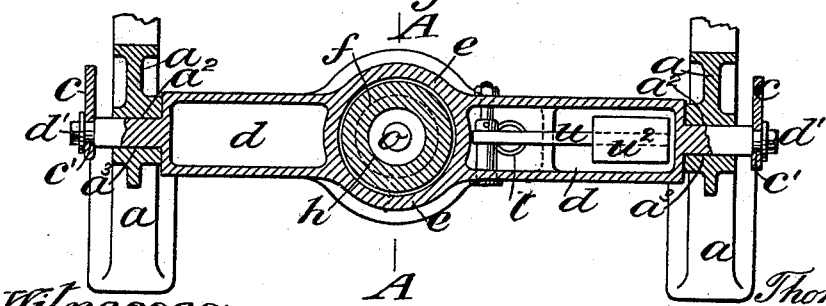
Witnesses:
C. Sundgren
D. K. Hayward
Inventor:
Thomas Furnival
by attorneys
Brown & Seward (No Model.) 6 Sheets—Sheet 3.
T. FURNIVAL.
GUILLOTINE FOR CUTTING PAPER.
No. 509,522. Patented Nov. 28, 1893.
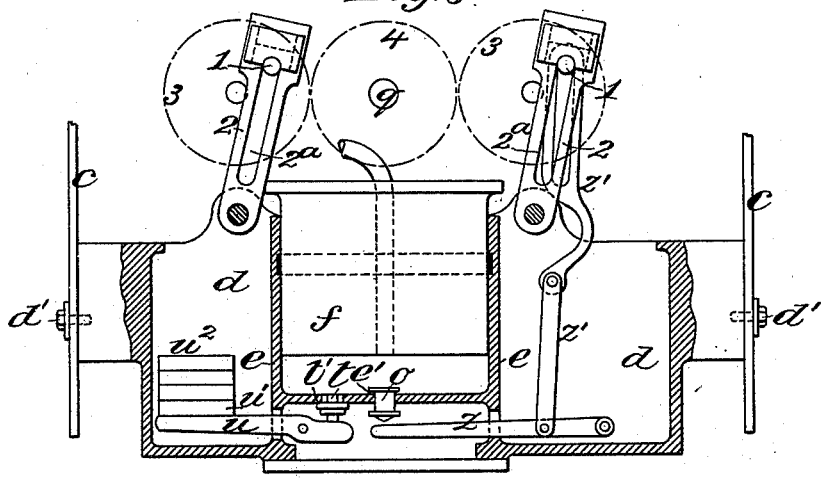
Fig. 8
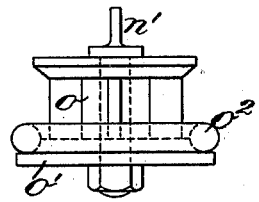
Fig. 10.
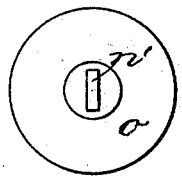
Fig. 11.
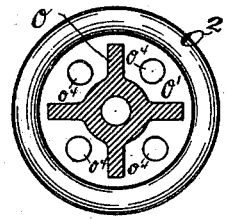
Fig. 12.
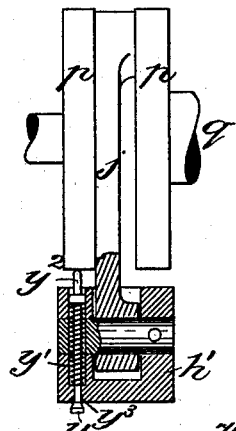
Fig. 5ª
Witnesses:—
C. L. Sundgren
George Barry.
Inventor:—
Thomas Furnival
by attorneys
Brown & Seward (No Model.) 6 Sheets—Sheet 4.

T. FURNIVAL.
GUILLOTINE FOR CUTTING PAPER.

No. 509,522. Patented Nov. 28, 1893.

Witnesses:
C. F. Sundgren
T. W. Hayward

Inventor:
Thomas Furnival
by attorneys
Brown & Seward

THE NATIONAL LITHOGRAPHING COMPANY,
WASHINGTON, D. C.

(No Model.) 6 Sheets—Sheet 5.
T. FURNIVAL.
GUILLOTINE FOR CUTTING PAPER.

No. 509,522. Patented Nov. 28, 1893.

Witnesses:
C. E. Sundgren
W. H. Nayport

Inventor:
Thomas Furnival
by attorneys
Brown & Seward (No Model.) 6 Sheets—Sheet 6.

T. FURNIVAL.
GUILLOTINE FOR CUTTING PAPER.

No. 509,522. Patented Nov. 28, 1893.

Witnesses:-
C. Sundgren
George Barry.

Inventor:-
Thomas Furnival
by attorneys
Brown & Seward

UNITED STATES PATENT OFFICE.

THOMAS FURNIVAL, OF REDDISH, ENGLAND.

GUILLOTINE FOR CUTTING PAPER.

SPECIFICATION forming part of Letters Patent No. 509,522, dated November 28, 1893.

Application filed December 14, 1891. Serial No. 414,911. (No model.) Patented in England January 20, 1890, No. 976.

*To all whom it may concern:*

Be it known that I, THOMAS FURNIVAL, engineer, of the Reddish Iron Works, Reddish, in the county of Lancaster, England, have invented certain new and useful improvements in certain of the machines known as guillotines and used for cutting paper or other materials, (for which I have, jointly with Edward Tudor, Jr., cashier, of the Reddish Iron Works, Reddish, William Byway, plumber, of 138 Princess Street, Manchester, and Harry Grimshaw, chemical manufacturer, of Clayton, near Manchester, county of Lancaster, England, obtained Letters Patent of the United Kingdom of Great Britain and Ireland, No. 976, dated January 20, 1890,) of which the following is a specification.

My invention relates to such of the machines known as "guillotines" and used for cutting paper and other materials are as provided with means or apparatus by which without attention on the part of the attendants the paper or other material being cut is held while being cut and released when cut and my invention consists in arrangements by which I am enabled to cause the paper or other material to be securely held while being cut and to be readily released when cut.

According to my invention I cause the paper or other material to be cut to be held by a clamp pressed upon such paper or other material by means of pressure exerted upon a liquid in a cylinder connected to the said clamp the said pressure being produced by means of a piston or plunger of such size that the required pressure may be readily exerted upon the clamp or by the supply of liquid under suitable pressure to the said cylinder. To cause the paper or other material being cut to be released when cut I cause a valve with which the cylinder aforesaid is provided to be raised or moved at the required times from the seating in conjunction with which it acts so that the water or other liquid in the said cylinder will be relieved of pressure in order that the clamp employed to hold the paper or other material while being cut may be moved so as to release such paper or other material.

Figure 9:
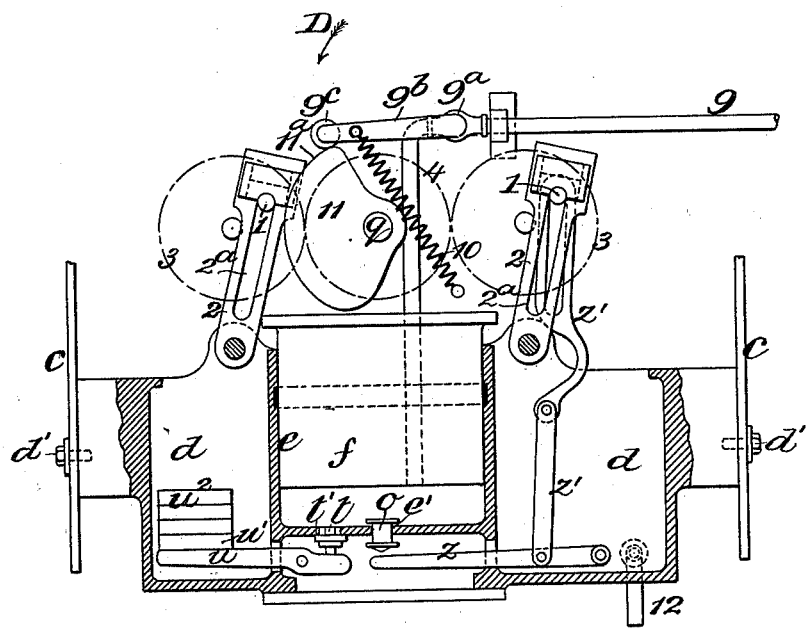

In the accompanying drawings Figure 1 is a side elevation; Fig. 2 a back elevation partly in section; Fig. 3 a longitudinal horizontal section with certain parts omitted and Fig. 4 a section with certain parts omitted taken on the plane indicated by the line A A of Fig. 3 and these figures illustrate a "guillotine" or paper cutting machine of the kind now well known as "Furnival's" having my invention applied thereto. Figs. 5 and 5ᵃ are sections illustrating a valve for the escape of air from the cylinder employed in machines constructed according to my invention. Fig. 6 is a side elevation, Fig. 7 a back elevation and Fig. 8 a partial transverse section taken on the plane indicated by the line C C in Fig. 6 of a machine similar as a whole to the machine illustrated in Figs. 1, 2, 3 and 4 but having the cylinder in which the piston or plunger by which the pressure is exerted upon the liquid employed situated distinct from the cylinder connected to the clamp of the machine. Fig. 9 is a partial transverse section of a machine similar to that shown in Figs. 1, 2, 3, 4, 6, 7 and 8 but having pressure exerted upon the liquid in the cylinder connected to the clamp of the machine by means of a supply of water under pressure derived from a source independent of the machine. Fig. 10 is a side view; Fig. 11 a plan and Fig. 12 a transverse section of a valve employed in the machines illustrated in Figs. 1, 2, 3, 4, 6, 7, 8 and 9.

In the accompanying drawings $a\ a$ are the side-frames of the machine.

$b$ is the clamping-bar or top press. The ends of the clamping-bar or top press $b$ project through slots $a'$ formed in the side-frames $a$ which slots $a'$ serve to guide the clamping-bar or top press $b$ in in its upward and downward movements.

To each end of the clamping-bar or top press $b$ is jointed the upper end of a side-rod or connecting rod $c$ which in its lower part is provided with a slot $c'$ through which passes a stud $d'$ secured to the tank or receptacle $d$ to which is connected the cylinder $e$ into which projects a ram $f$ which is secured by bolts to but might be made a part of the cross stays $g$ which are secured at their ends to the side frames $a$ of the machine. The slots $c'$ are so formed and placed that while the studs $d'$ can not descend without drawing down the side rods or connecting rods $c$ and the clamping-bar or top press $b$ the side rods or connecting rods $c$ may be moved downward without acting upon the studs $d'$ and tank or receptacle $d$.

Formed in or secured to the ram $f$ is a cylinder or barrel $h$ provided with a piston $h'$ connected by a connecting rod $j$ with the crank-pin $k$ employed to cause the clamping-bar or top press $b$ to press upon and hold the paper or other material while being cut and to release it when cut.

The tank or receptacle $d$ may be moved upward and downward between slides $a^2$ formed on the side frames $a$ and slides formed on parts $a^3$ secured by set screws and pins to the side frames $a$, the side frames $a$ and parts $a^3$ serving to guide the said tank or receptacle $d$ both longitudinally and laterally.

$m$ is the treadle by which the clamping-bar or top press $b$ is brought down upon the paper or other material to be cut when such paper or other material is being placed in position for being cut in order that the said paper or other material may be properly adjusted into position. The weight of the treadle $m$ and the weight of the side rods or connecting rods $c$ and clamping-bar or top press $b$ are counter-balanced by the treadle counterbalance weight $m'$ so that when the treadle $m$ is depressed the weight $m'$ rises and the clamping bar or top press $b$ is lowered to the position required and when the treadle $m$ is released the weight $m'$ again raises the clamping bar or top press $b$.

Suitable cup leathers are employed around the ram $f$ and upon the piston $h'$ in order that leakage of the water or other liquid employed may not take place.

Connected to the piston $h'$ by means of a screw or stud $h^2$ which also by means of a plate or washer secures to the said piston $h'$ the cup leather employed in conjunction therewith, is a chain $n$ connected at its lower end by means of a bolt $n'$ to a valve $o$ which at times as will be hereinafter described acts in conjunction with a seating $e'$ formed at the bottom of the cylinder $e$. The construction of the valve $o$ is more clearly shown in Figs. 10, 11 and 12 of the accompanying drawings.

The chain $n$ is made of such length that as soon as or soon after the piston $h'$ commences to descend in the cylinder $e$ the valve $o$ will be lowered into position upon the seating $e'$ so that the escape of water or other liquid from the cylinder $e$ will by means of such valve be prevented and that when the piston $h'$ is caused to ascend in the cylinder $e$ and raise the valve $o$ from the seating $e'$ the movement of such piston $h'$ after the valve $o$ has been raised from the seating $e'$ will by means of the plate $o'$ connected to the valve $o$ by means of the bolt $n'$ raise the tank or receptacle $d$ so as to allow the clamping-bar or top press $b$ to be raised so as to release the paper or other material being operated upon after it has been cut.

The crank-pin $k$ is secured in disks $p$ secured upon the adjacent ends of the parts of the shaft $q$ upon which is mounted the elliptical toothed wheel $q'$ in which is mounted the crank-pin $q^2$ by means of which the knife $r$ of the guillotine cutting machine is actuated. The wheel $q'$ receives motion by means of the usual gearing employed in guillotine cutting machines of the kind being described which gearing with the exception of the wheel $s$ is omitted from Figs. 1 and 2 of the accompanying drawings as it is well understood by persons conversant with guillotine cutting machines.

The communication between the interior of the cylinder $e$ and the interior of the tank or receptacle $d$ is controlled by a valve $t$ which is pressed into contact with the seating $t'$ in conjunction with which it acts by a lever $u$ mounted upon a stud passing through and secured in the walls of the tank or receptacle $d$.

Upon the lever $u$ is secured a weight $u'$ upon which another weight or weights $u^2$ may be placed in order that the descent of the piston $h'$ will be caused to exert the required pressure upon the liquid contained in the cylinder $e$ while an excessive pressure is prevented from being exerted upon such liquid. The weights $u'$ and $u^2$ placed upon the lever $u$ are of such mass as to exert the required pressure upon the valve $t$.

Before the machine is put to work the tank or receptacle $d$ and so much of the cylinder $e$ as is not occupied by the ram $f$ and the piston $h'$ are filled with water or other liquid which is not corrosive or otherwise objectionable. The level of the upper surface of the liquid in the tank or receptacle $d$ is indicated by the line B B.

When the machine illustrated in Figs. 1, 2, 3 and 4 is in use the paper or other material to be cut, which must not exceed in thickness the distance between the upper surface of the table $v$ and the lower surface of the clamping bar or top press $b$ when the said clamping bar or top press $b$ is in the position in which it is indicated in Figs. 1 and 2 is placed upon the table $v$. The operator depresses the treadle $m$ and thus brings down the clamping-bar or top press $b$ upon the said paper or other material so that the front edge of the clamping-bar or top press will indicate the position where the cut would be made by the knife $r$ of the machine were such knife $r$ depressed. After the paper or other material has been adjusted into the required position the operator releases the treadle $m$ and then the balance weight $m'$ causes the clamping-bar or top press $b$ to rise to its original position. The machine is then "started." The wheels $q'$ and $s$ revolve in the directions indicated by the arrows respectively applied thereto. As the wheels $s$ and $q'$ rotate the piston $h'$ is lowered and lowers the tank or receptacle $d$ until by reason of the clamping bar or top press $b$ resting upon the paper or other material to be cut such tank or receptacle $d$ becomes supported by means of the side rods or connecting rods $c$ connected to the clamping-bar or top press $b$. The further descent of the piston $h'$ causes the chain $n$ to cease to support the valve $o$ which then passes into contact with the seating $e'$ in conjunction with which it acts and the continued descent of the piston $h'$ will cause pressure to be exerted upon the water or other liquid in the cylinder $e$ and thus cause the clamping bar or top press $b$ to be strongly pressed upon the paper or other material to be cut. The pressure exerted upon the paper or other material is controlled by the weights $u'$, $u^2$ which press the valve $t$ upon the seating $t'$ in conjunction with which it acts and may be varied by more or fewer weights $u^2$ being placed upon the lever $u$. If after the required pressure has been exerted upon the liquid in the cylinder $e$ the piston $h'$ continues to descend the valve $t$ will be raised from the seating $t'$ in conjunction with which it acts and the liquid will escape from the cylinder $e$ into the tank or receptacle $d$. After the "cut" has been made and the knife $r$ commences to be moved upward the piston $h'$ is also moved upward and ceases to exert pressure upon the liquid contained in the cylinder $e$. Liquid will then by raising the valve $o$ from the seating $e'$ in conjunction with which it acts commence to enter the cylinder $e$ from the tank or receptacle $d$ and the ascent of the piston $h'$ then causes the chain $n$ to raise the valve $o$ still further out of contact with the seating $e'$ in conjunction with which it acts and to raise the tank or receptacle $d$ so as to allow the counterbalance weight $m'$ to raise the clamping-bar or top press $b$ from the paper or other material upon the table $v$. The machine may then again be operated in a similar manner.

Water or other liquid will require to be supplied to the tank or receptacle $d$ from time to time in order that the loss of water or other liquid arising from evaporation or other causes may be compensated for. By means of the cock or tap $w$ a pressure-gage may be applied to the cylinder $e$ in order to ascertain the pressure exerted by the piston $h'$ upon the liquid contained in such cylinder $e$. By means of the tap or cock $x$ the water or other liquid contained in the cylinder $e$ and tank or receptacle $d$ may whenever it is desirable be withdrawn therefrom.

In order that when the chain $n$ raises the valve $o$ in order to raise the tank or receptacle $d$ concussion may be avoided I surround the lower part of the valve by a ring $o^2$ of indiarubber held in position in any suitable manner and in order that when the valve $o$ is required to close the opening which is surrounded by the seating $e'$ in conjunction with which the said valve acts the said ring $o^2$ of indiarubber may not adhere to the lower outer surface of the wall of the cylinder $e$ I place above such ring $o^2$ of indiarubber a plate $o^3$ of metal. In order that when the chain $n$ raises the valve $o$ in order to raise the tank or receptacle $d$ the water or other liquid displaced by the ram $f$ may be allowed to escape from the cylinder $e$ holes $o^*$ are formed as shown in Fig. 12 through the plate $o'$ secured to the valve $o$ and communicate with the spaces between the wings of the valve $o$.

It is found in practice that air tends to be carried into the cylinder or barrel $h$ and as an accumulation of air beneath the piston $h'$ would seriously interfere with the working of a machine constructed according to my invention I provide the piston $h'$ with a valve $y$ shown more clearly in Figs. 5 and $5^a$. The valve $y$ operates in conjunction with a seating $y^3$ formed at the lower end of a passage or opening formed through the piston $h'$ and a spring $y'$ which tends to press the valve $y$ in contact with the said seating $y^3$ and so close the said passage or opening except at such times as the valve $y$ is forced away from the seating $y^3$ by the upper end of the rod $y^2$ secured to or forming part of the valve $y$ being brought into contact near the upper end of the stroke of the piston with one of the disks $p$ in which the crank-pin $k$ is mounted. Near to the end of each upward stroke of the piston $h'$ the upper end of the rod $y^2$ will be brought into contact with the said disk $p$ and the valve $y$ will be moved away from the seating $y^3$ so that the water or other liquid contained in the cylinder or barrel $h$ may rise to the same level as the upper surface of the water or other liquid in the tank or receptacle $d$ and in so doing expel any air which may have passed into the cylinder $e$ or cylinder or barrel $h$.

Figure 7:
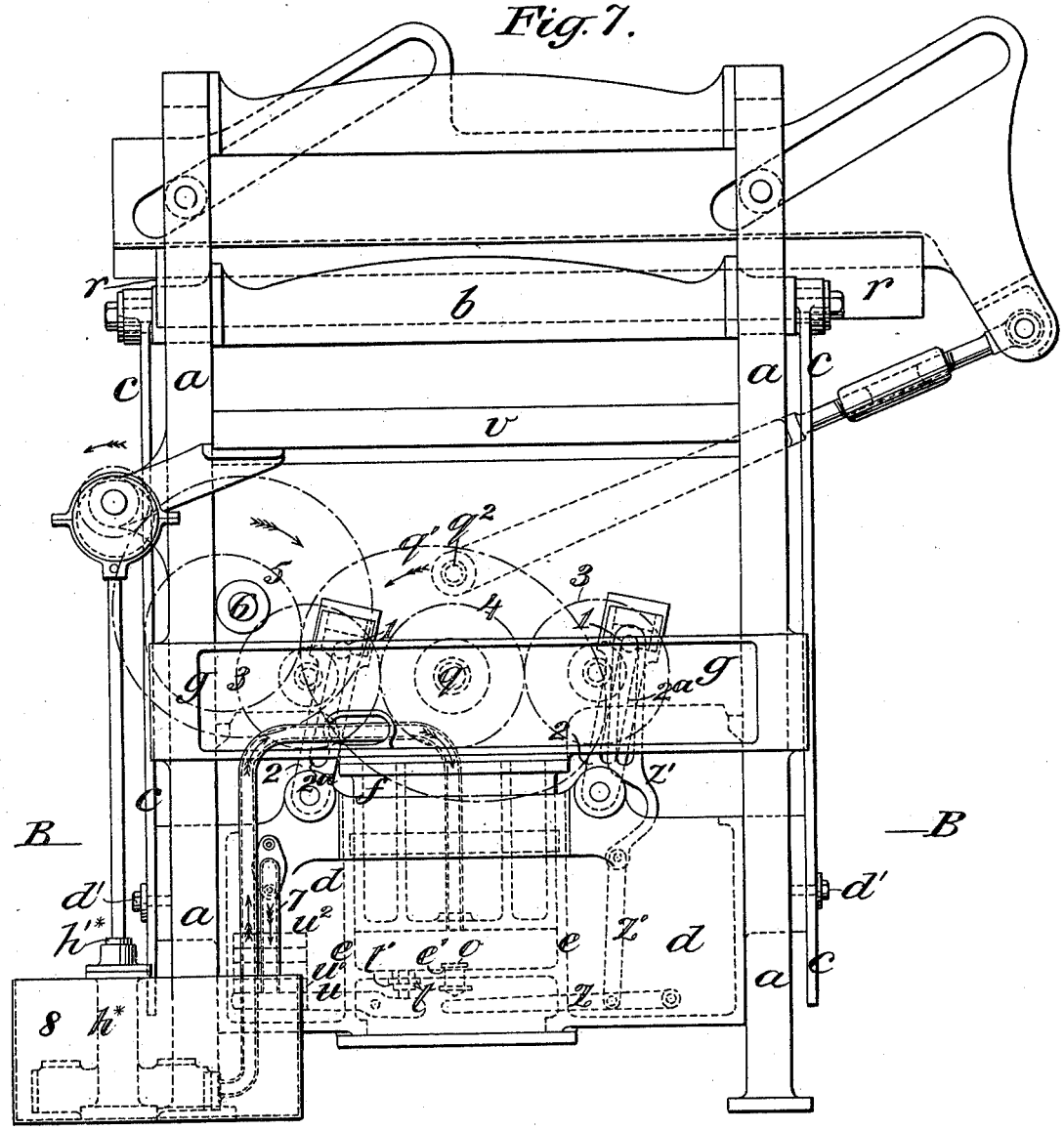

In Figs. 6, 7 and 8 is shown a machine constructed according to my invention which while generally similar to that illustrated in Figs. 1, 2, 3 and 4 differs therefrom in certain respects.

In the machine illustrated in Figs. 6, 7 and 8 the valve $o$ is raised from and lowered upon the seating $e'$ in conjunction with which it acts by means of a lever $z$ and a jointed connecting rod $z'$ one end of which is connected to one of two crank-pins 1 which by means of connecting rods 2 raise and lower the tank or receptacle $d$ so as to raise and lower the clamping bar or top press $b$ from and into contact with the paper or other material to be clamped thereby. The connecting rods 2 are provided with slots $2^a$ to allow of the crank pins 1 which pass therein passing down such slots when the tank or receptacle $d$ becomes supported by the clamping bar or top press $b$ resting upon the paper or other material to be cut.

At the upper ends of the slots in the connecting rods 2, packings of indiarubber or other suitable elastic material are provided in order that concussion in the working of the machine may be avoided.

The crank pins 1 are as is indicated in the drawings respectively mounted in wheels 3 gearing into the wheel 4 and receiving motion by means of the wheel 5 upon the main driving shaft 6 of the machine.

In the machine illustrated in Figs. 6, 7 and 8 when the movement of the crank-pins 1 has brought the tank or receptacle $d$ into such position that it is supported by the clamping-bar or top press $b$ resting upon the paper or other material to be cut, the continued movement of the crank pin 1 projecting into the slot in the connecting rod $z'$ will lower such connecting rod $z'$ and the lever $z$ so as to allow the valve $o$ to press upon the seating $e'$ in conjunction with which it acts and close the outlet from the cylinder $e$. As soon as the valve $o$ closes the outlet from the cylinder $e$ the piston $h'^*$ which forms the plunger of a force pump $h^*$ and which is continually reciprocated while the main driving shaft 6 of the machine is revolving will cause pressure to be exerted upon the water or other liquid in the cylinder $e$ and continue to force more water or other liquid therein until the pressure in such cylinder becomes so great as to move the valve $t$ from the seating $t'$ in conjunction with which it acts and allow water or other liquid to escape from the cylinder $e$. When the cut has been made the continued revolution of the crank-pin 1 projecting into the slot formed in the connecting rod $z'$ will raise the connecting rod $z'$ and lever $z$ so as to lift the valve $o$ from the seating $e'$ in conjunction with which it acts and thus relieve the water or other liquid in the cylinder $e$ from pressure. The continued revolution of the crank-pins 1 will cause the tank or receptacle $d$ to be raised so as to allow the clamping bar or top press $b$ to be raised clear of the paper or other material by means of the counterbalance weight $m'$. The water or other liquid expelled from the cylinder $e$ into the tank or receptacle $d$ during the ascent of the tank or receptacle $d$ and any water or other liquid forced into the cylinder $e$ at such times as the valve $o$ is not in contact with the seating $e'$ in conjunction with which its acts will escape from the tank or receptacle $d$ by means of the pipe 7 into the tank or vessel 8 in which the force pump $h^*$ is situate and from which such pump $h^*$ derives its supply of water or other liquid.

Except in so far as has been above described the machine illustrated in Figs. 6, 7 and 8 is similar in construction and operation to the machine illustrated in Figs. 1, 2, 3 and 4.

In machines constructed according to my invention it is possible to very readily adjust the pressure exerted upon the paper or other material to be cut so that such paper will be securely held while being cut and in consequence of the tank or receptacle $d$ being always raised to the same position after the cut has been made and always being lowered without any attention on the part of the attendant until supported by the clamping-bar or top press $b$ resting upon the paper or other material before the pressure for holding the said paper or other material commences to be exerted thereon the attendant in charge of the machine has not in any way to adjust the clamping bar or top press $b$ in regard to the paper or other material to be cut.

In some cases instead of supplying water or other liquid to the above mentioned cylinder by means of a pump or other similar apparatus actuated by the machine I purpose to supply water or other suitable liquid to the cylinder before mentioned by a pump worked in any convenient manner or I supply water or other liquid from any suitable source.

The machine constructed according to this arrangement of my invention as a whole resembles that illustrated in Figs. 6, 7 and 8 of accompanying drawings, the differences required to be made in the arrangement being obvious to persons conversant with machines of the class to which my invention relates; but in order that this form of my invention may be more easily understood I have in Fig. 9 clearly shown the features in which a machine constructed according to this form of my invention differs from the machine illustrated in Figs. 6, 7 and 8. The parts shown in Fig. 9 which bear the same letters and numerals of reference as are applied to parts shown in Fig. 8 operate precisely like the parts last named. (9) is the pipe through which water or other liquid under pressure is supplied to the machine. The pipe (9) is provided with a valve or cock $(9^a)$ provided with a lever $(9^b)$ upon the end of which is mounted a bowl $(9^c)$ which by the action of a spring (10) connected at one end to the lever $(9^b)$ and at the other end to any convenient part is pressed against a cam (11) mounted fast upon the shaft $(q)$. The cam (11) is mounted upon the shaft $(q)$ in such position that when the machine is at rest the bowl $(9^c)$ will rest upon the projecting part $(11^a)$ of the cam (11) and near to the end of such projecting part $(11^a)$ so that as soon as the machine is started "to make the cut" the projecting part $(11^a)$ of the cam will cease to support the said bowl $(9^c)$. When the machine is started to make the cut the projecting part $(11^a)$ of the cam (11) will be moved clear of the bowl $(9^c)$ and the spring (10) will turn the lever $(9^b)$ in the direction indicated by the arrow D and open the valve $(9^a)$ so that the pressure of the water or other liquid under pressure in the pipe (9) may be brought to bear upon the water or other liquid in the cylinder $(e)$, the valve $(o)$ being lowered in the manner previously described so as to close the outlet from the cylinder $(e)$. The pressure of the water or other liquid supplied by the pipe (9) being then exerted in the cylinder $(e)$ the clamping bar or top press $(b)$ will be pressed into contact with and securely hold the paper or other material while it is cut. When the cut has been made and it is required that the clamping bar or top press shall release the paper or other material which has been cut, the projecting part $(11^a)$ of the cam (11) is brought beneath the bowl $(9^c)$ by the continued revolution of the shaft $(q)$ and raises the lever $(9^b)$ so closing the valve (9ª) so that the cylinder (e) is shut off from the supply of water or other liquid and the valve (o) being raised from its seating by the links (z') and lever (z) the cylinder (e) may be raised by the crank pins (1) and connecting rods (2) so that the clamping bar or top press (b) may be raised from and release the paper or other material which has been cut.

In order that the water or other liquid which has been employed in the cylinder (e) may escape from the tank or receptacle (d) such tank or receptacle (d) is provided with an outlet pipe (12). The water or other liquid issuing from the outlet pipe (12) may be conveyed away in any suitable manner.

In the arrangement of machine illustrated in the accompanying drawings the weight of the tank or receptacle d and cylinder e and the weight of the water or other liquid contained in or supported by such tank or receptacle d assists in holding the paper to be cut by the knife and except in case of the machine described in reference to Fig. 9 the water or other liquid employed is used over and over again.

Although the valve t is shown in the accompanying drawings as being pressed into contact with the seating in conjunction with which it acts by means of weights $u'$ $u^2$ springs may be employed to press such valve t into contact with the seating $t'$ in conjunction with which it acts.

What I claim, and desire to secure by Letters Patent, is—

1. In a guillotine cutting machine, the combination of a clamping bar or top press b, a tank d, connecting rods between said tank and the clamping bar, a cylinder e having a liquid therein, means for exerting pressure upon the liquid and thereby pressing the clamping bar upon the material to be cut, and a valve o between said cylinder and tank, substantially as set forth.

2. In a guillotine cutting machine, the combination of a clamping bar or top press b, a tank d, connecting rods between the clamping bar and tank, a cylinder e formed with or secured to the tank, a ram f secured to or forming part of the frame-work of the machine, a cylinder or barrel h, a piston h' operating therein, a valve o by which liquid may at times be prevented from escaping from the cylinder e, and a chain between the piston and the said valve o, substantially as and for the purpose set forth.

3. In a guillotine cutting machine, the combination of a clamping bar or top press b, a tank or receptacle d, connecting rods between said tank and the clamping bar, a cylinder e formed with or secured to the tank or receptacle, a ram f secured to or forming part of the framework of the machine and provided with a cylinder or barrel, h, a piston h' to operate in the said cylinder or barrel, a valve o connected by a chain n to the piston h' so as to be moved at times thereby, and a valve t, substantially as and for the purpose herein set forth.

4. In a guillotine cutting machine, the combination of a clamping bar or top press b, a tank d, connecting rods between said tank and clamping bar, a cylinder e formed with or secured to the tank, a ram f secured to or forming part of the framework of the machine and provided with a cylinder or barrel h, a piston h' to operate in the said cylinder or barrel, a valve o connected to the piston h' by a chain n so as to be moved at times thereby, a valve t, and a valve y, substantially as and for the purpose set forth.

THOMAS FURNIVAL.

Witnesses:
 HOWARD CHEETHAM,
18 *Saint Ann's Street, Manchester, England.*
 ERNEST DUTCH,
97 *Dickenson Rd., Rusholme, Manchester, England.*